(12) United States Patent
Latifzada

(10) Patent No.: US 9,852,664 B2
(45) Date of Patent: Dec. 26, 2017

(54) MAGNETICALLY COUPLED HANGER AND PLACARD FOR MOTOR VEHICLES

(71) Applicant: Sear Latifzada, Foothill Ranch, CA (US)

(72) Inventor: Sear Latifzada, Foothill Ranch, CA (US)

(*) Notice: Subject to any disclaimer, the term of this patent is extended or adjusted under 35 U.S.C. 154(b) by 0 days.

(21) Appl. No.: 15/161,176

(22) Filed: May 20, 2016

(65) Prior Publication Data

US 2017/0337853 A1  Nov. 23, 2017

(51) Int. Cl.
*G09F 21/04* (2006.01)
*G09F 3/08* (2006.01)
*F16B 1/00* (2006.01)

(52) U.S. Cl.
CPC .............. *G09F 3/08* (2013.01); *F16B 1/00* (2013.01); *F16B 2001/0035* (2013.01)

(58) Field of Classification Search
CPC ............. G09F 7/04; G09F 7/9375; G09F 7/06
USPC .................................................... 40/593, 643
See application file for complete search history.

(56) References Cited

U.S. PATENT DOCUMENTS

| | | | |
|---|---|---|---|
| 3,313,053 A | 4/1967 | Vogeli | |
| 3,529,328 A * | 9/1970 | Davison | A47G 25/485 16/87.2 |
| 3,716,935 A * | 2/1973 | Friederichs | G09F 7/04 273/239 |
| 5,253,943 A * | 10/1993 | Miyashita | B42F 15/0029 281/43 |
| D429,286 S | 8/2000 | Luciani et al. | |
| 6,564,981 B2 | 5/2003 | Murphy | |
| 6,708,435 B2 * | 3/2004 | Massey | G09F 3/16 40/643 |
| 6,766,039 B1 * | 7/2004 | Al-Sheikh | A45C 13/42 382/115 |
| 7,150,120 B1 | 12/2006 | Naymik | |
| 7,555,858 B2 * | 7/2009 | Binder | G09F 21/04 248/205.3 |
| 7,686,373 B1 * | 3/2010 | McCabe | B60R 7/05 224/277 |
| 8,220,188 B1 | 7/2012 | Keller | |
| D697,556 S | 1/2014 | Massaad | |

(Continued)

OTHER PUBLICATIONS

UniMagnet; UniMagnet Web Pages "Injection Molding Magnets"; http://www.magneticpowders.com/index.html; Downloaded Jun. 20, 2016; 3 pages.

(Continued)

*Primary Examiner* — Shin Kim
(74) *Attorney, Agent, or Firm* — Alford Law Group, Inc.; William E. Alford

(57) ABSTRACT

Method and apparatus are disclosed for magnetically connecting a placard to a rearview mirror of a motor vehicle. The apparatus includes a magnetic hanger which connects to the stem of the rearview mirror. A magnetic placard adapter removably receives a hanging portion of a standard placard. The magnetic placard adapter is removably connectable to the magnetic hanger. The magnetic placard adapter is magnetically connected to the magnetic hanger. In other embodiments, the placard itself is formed with a magnetic portion to form a magnetic placard that magnetically couples to the magnetic hanger, directly without the need for the magnetic placard adapter.

20 Claims, 14 Drawing Sheets

(56) References Cited

U.S. PATENT DOCUMENTS

| | | | | |
|---|---|---|---|---|
| 2002/0133992 A1* | 9/2002 | Wu | ............................ | G09F 7/04 40/661.01 |
| 2004/0000080 A1* | 1/2004 | Massey | ...................... | G09F 3/16 40/599 |
| 2004/0016162 A1* | 1/2004 | Rendon | ...................... | G09F 3/20 40/654.01 |
| 2004/0221498 A1* | 11/2004 | Vico | ........................ | G09F 21/04 40/593 |
| 2007/0175076 A1* | 8/2007 | Stanley | ................... | B60R 11/00 40/593 |
| 2011/0314713 A1 | 12/2011 | Massaad | | |
| 2015/0056599 A1* | 2/2015 | O'Connor | ................ | B42F 13/16 434/407 |

OTHER PUBLICATIONS

UniMagnet; UniMagnet Web Page "FAQ"; Usual Glossary; http://www.magneticpowders.com/index.html; Downloaded May 4, 2016; 1 page.

* cited by examiner

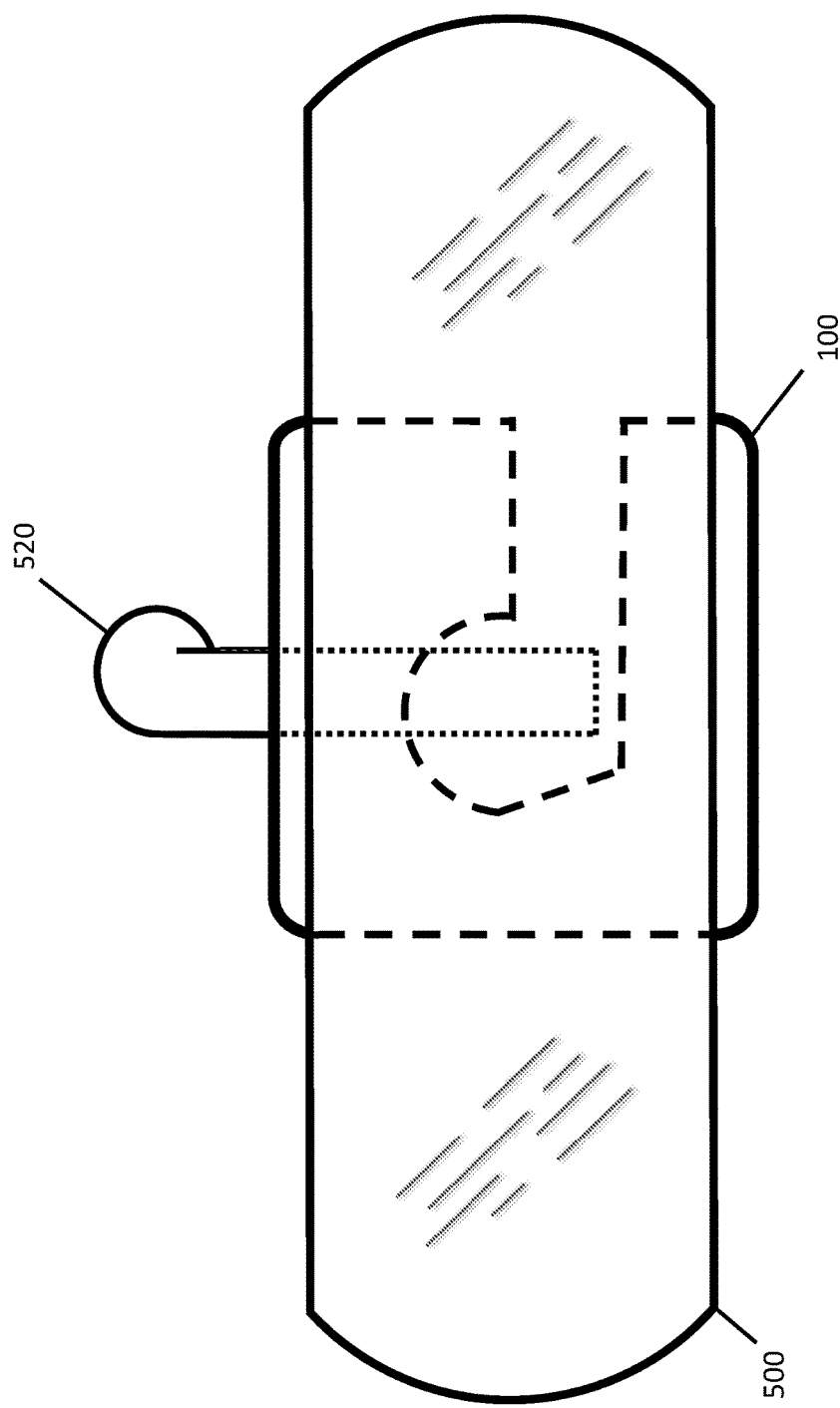

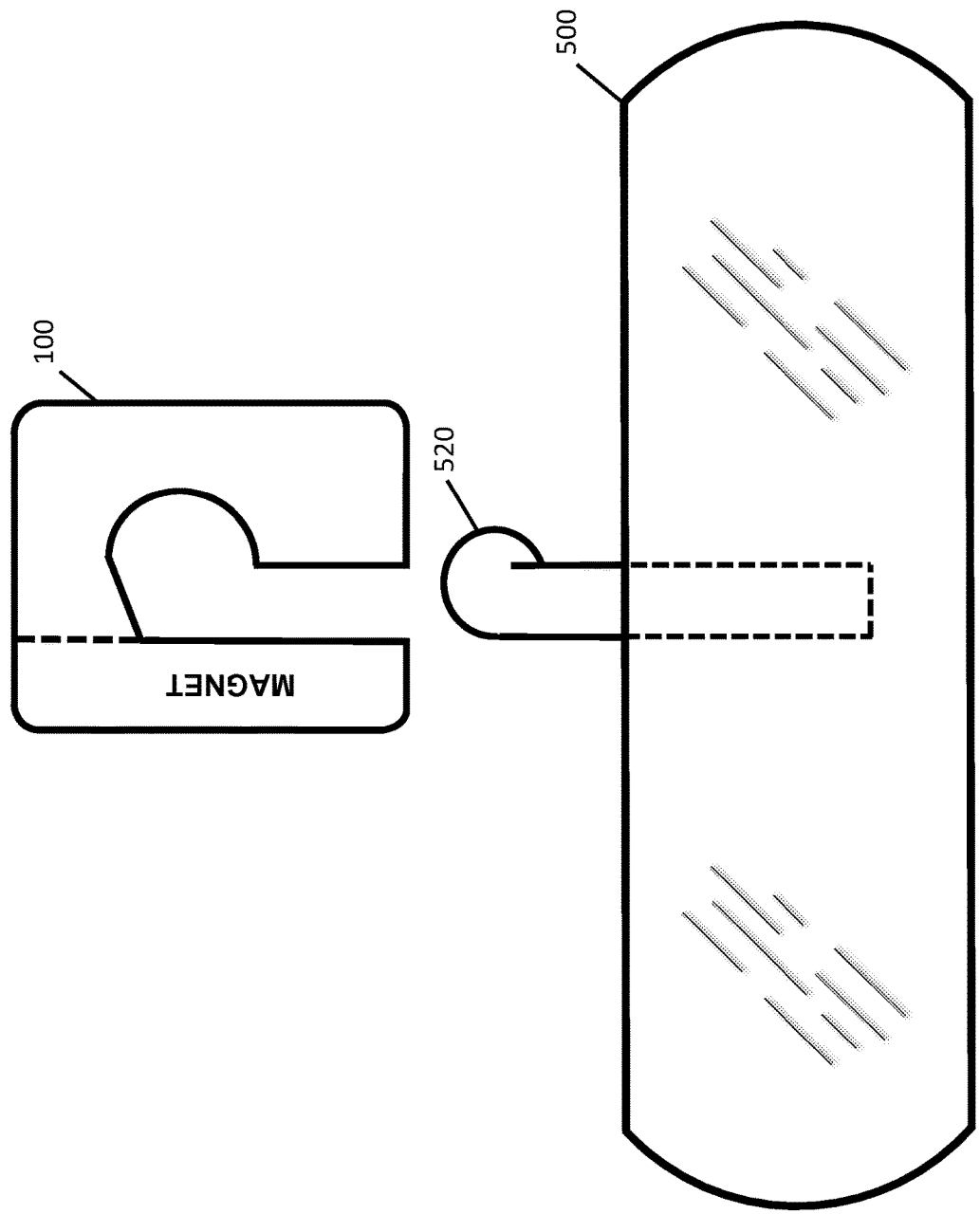

MAGNETICALLY COUPLED HANGER AND PLACARD FOR MOTOR VEHICLES

FIELD

The embodiments of the invention generally relate to holders for displaying a placard or other printed substrate in the interior of a motor vehicle.

BACKGROUND

Vehicle passes often must be displayed in motor vehicles when the motor vehicle enters or is parked in a restricted area. The vehicle pass oftentimes takes the form of a plastic placard which bears written authorization information. The placard must be displayed in a prominent location so that the operators of the restricted area can view the placard from outside the vehicle. The rearview mirror of the motor vehicle adjacent or coupled to a front window provides a convenient place to attach the placard.

In many instances the placards cannot be permanently mounted to the motor vehicle (e.g. to comply with visibility or other regulations), such when the motor vehicle is operated on the highway, and needs to be dismounted. Between uses, the placard is often stowed away in the glove compartment of the motor vehicle.

Placards are often used by individuals with medical conditions, disabilities, or handicaps to allow them to park in handicap reserved parking spaces adjacent buildings. However, for such individuals, the placards may be difficult to mount and dismount from a rearview mirror due to their condition, disability, or handicap. Accordingly, there is a need to improve placards.

BRIEF SUMMARY

The embodiments of the invention are summarized by the claims that follow below.

BRIEF DESCRIPTIONS OF THE DRAWINGS

To further clarify various aspects of some example embodiments, a description thereof will be understood by reference to specific embodiments which are illustrated in the appended drawings.

FIG. 1 a front view of a magnetic hanger.

FIGS. 5A-5B are views of the magnetic hanger assembled from left to right and right to left onto the stem of a rearview mirror.

FIG. 5C is a view with the magnetic hanger being assembled from the top onto the stem of a rearview mirror.

DETAILED DESCRIPTION

Figure 1:
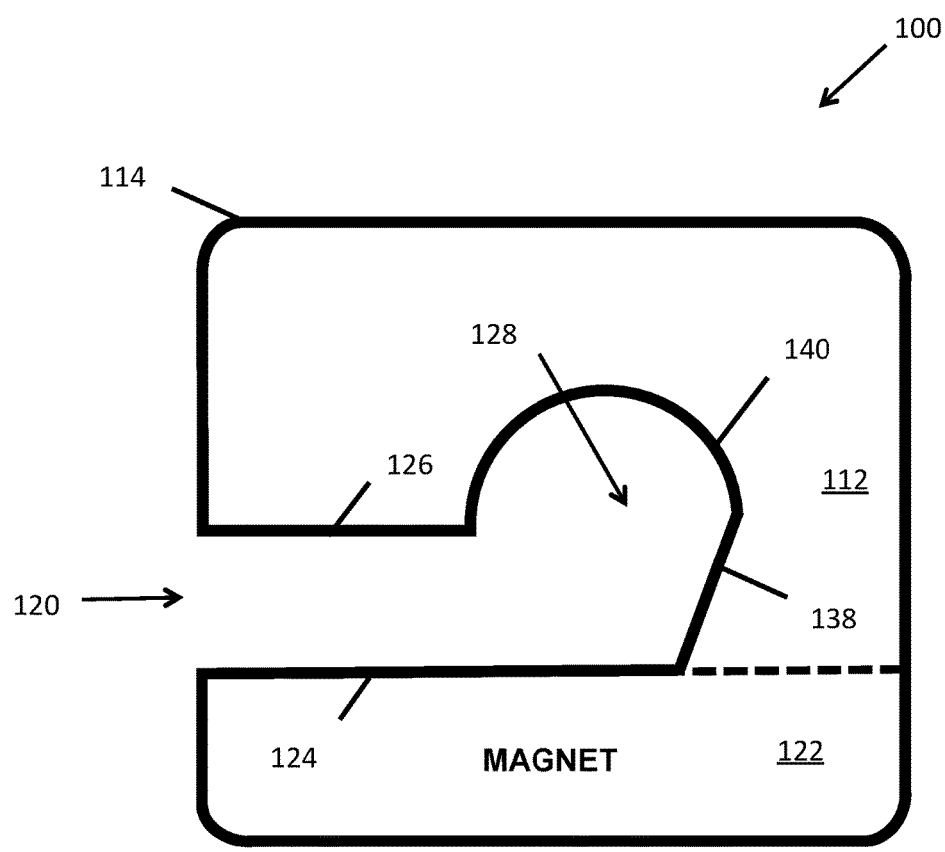

In the following detailed description, numerous specific details are set forth in order to provide a thorough understanding. However, it will be obvious to one skilled in the art that the embodiments of the invention may be practiced without these specific details. In other instances well known methods, procedures, and components have not been described in detail so as not to unnecessarily obscure aspects of the embodiments.

The embodiments disclosed include a method, apparatus and system for removably coupling a placard to the rearview mirror of a motor vehicle. The device is conveniently and removably attachable to the stem of the rearview mirror, and is capable of holding placards and other such items of different dimensions and configurations. In accordance with one embodiment, the device includes a magnetic hanger that connects to the stem of the rearview mirror, and a magnetic placard adapter that is removably magnetically connectable to the magnetic hanger. The magnetic placard adapter clamps to a non-magnetic placard with a pair of opposing hook and loop material fasteners. The connection of the magnetic placard adapter to the magnetic hanger employs magnetic elements or a magnetic member.

The term "magnetic member" is used herein to mean a member which is either magnetized by including a form of a magnetic material or is made from an attractive metallic material or metallic alloy material which is attracted by a magnet (such as iron). The magnetic material may be a solid magnet, a flexible magnet, a granular magnet or a magnetic powder that is encapsulated into a body material, such as plastic or a polymer. The attractive material may be a solid, granular, or powder form that is encapsulated into a body material, such as plastic or a polymer. A portion of a body including a magnetic member may be referred to as a magnetic portion. The body material is preferably a plastic or polymer, such as a thermoplastic or thermoset polymer, including but not limited to polyethylene, polypropylene, polystyrene, polyamide, polycarbonate, polyurethane, polyetheretherketone, polyimide, polyetherimide.

In accordance with an aspect of the embodiments, a magnetic placard adapter is magnetically connectable to the magnetic hanger. In accordance with another aspect of the invention, a first magnetic member is included in a portion of the body of the magnetic hanger. The magnetic placard adapter has another portion of its body that includes a second magnetic member. The first and second magnetic members cooperate to effect the magnetic connection of the magnetic placard adapter holder to the magnetic hanger. Other aspects of the embodiments will become apparent from the following detailed description, taken in conjunction with the accompanying drawings, which illustrate, by way of example, the principles of the invention.

Placard with Magnetic Placard Adapter

Referring now to FIGS. 1-5B, a first embodiment of a device and system for magnetically connecting a placard 300A to a stem 520 of a rearview mirror 500 in a motor vehicle is disclosed.

Referring now to FIG. 1, a magnetic hanger 100 is shown that includes a body 114 with a supporting portion 112 and a magnetic portion 122 separated by a straight edge 124 along openings 120,128. Overall the hanger 100 is formed of a flexible plastic with a magnetic powder being mixed in with the flexible plastic in the magnetic portion 122.

Exemplary dimensions of the magnetic hanger are 4 inches in width and 3.5 inches in height. The slide slit 120 has a 0.75 inch opening that is 2 inches below the top edge. The top edge 126 is 1.25 inches in length. The bottom edge 124 is 2.25 inches in length. The radius of the semicircle forming the center opening 128 and semicircle edge is 0.75 inches.

The body 114 of the magnetic hanger 100 includes a center opening 128 with a side slit 120. The side slit 120 allows the magnetic hanger 100 to be slid over a stem of a rearview mirror so that the center opening 128 mounts the magnetic hanger 100 to the stem. The body 114 includes a semi-circle edge 140, a slanted edge 138, and straight edges 124, 126 about the center opening 128 and side slit 120. The slanted edge 138 directs the stem 520 of the mirror up into the semi-circle edge 140 of the center opening 128. The supporting portion 112 of the body can support the additional weight magnetically coupled to the magnetic portion 122 of the magnetic hanger 100.

The center opening 128 and the side slit 120 provide the action to slide the magnetic hanger 100 onto the stem 520 of the mirror 500. Further action to ratchet the body 114 around the stem 520 and align the center opening 128 of the magnetic hanger 100 onto the stem 520. A ratcheting effect may level the magnetic hanger 100 onto the stem 520 in certain cases.

Figure 5B:
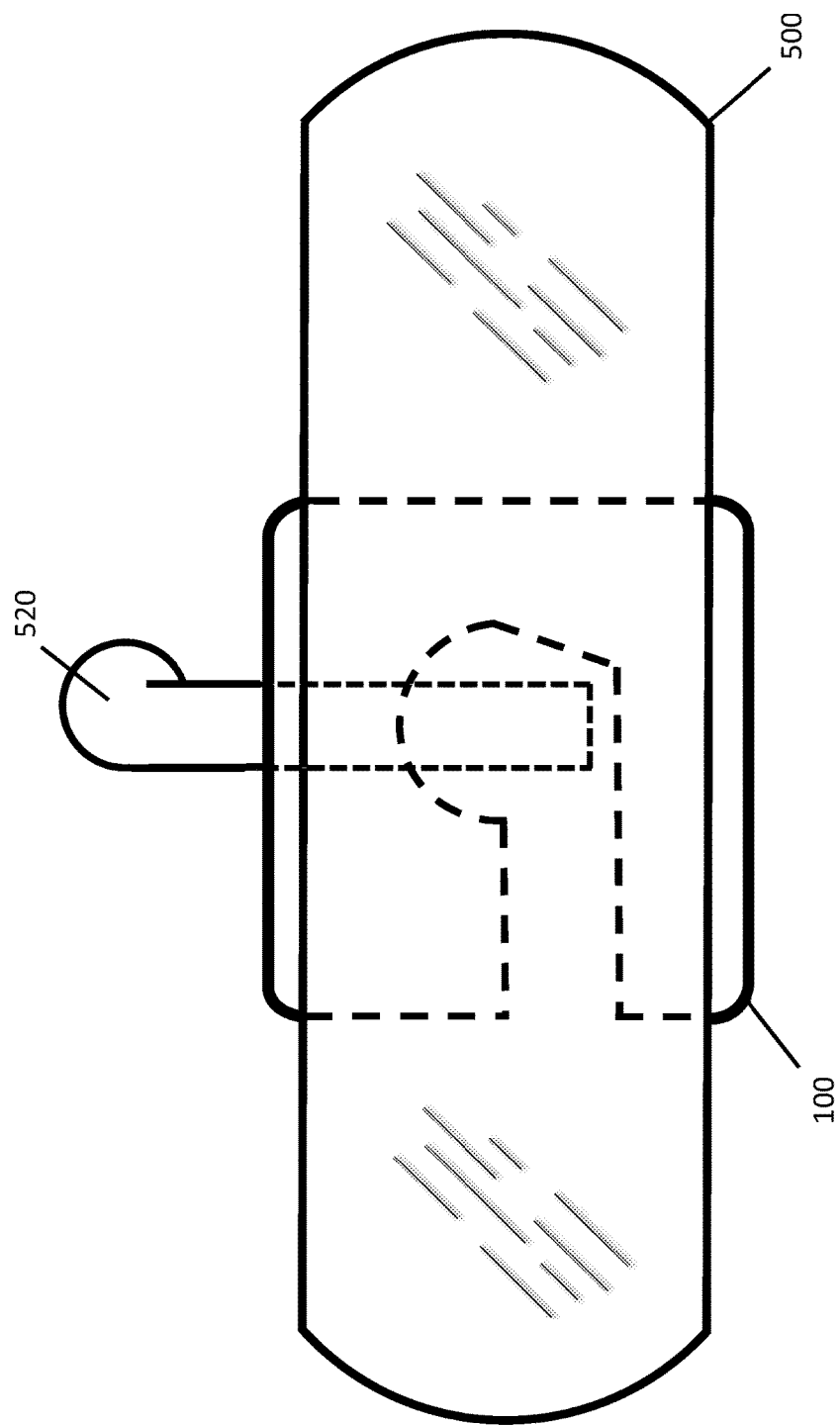

The magnetic hanger 100 may be coupled to a rearview mirror of a motor vehicle in different ways. In one method, the user may slide the magnetic hanger 100 from left to right over the shaft of the rearview mirror. In another method, the user may slide the magnetic hanger 100 from right to left over the shaft of the rearview mirror. In another method, the user may slide the magnetic hanger 100 from top to bottom over the shaft of the rearview mirror. When sliding from left to right or right to left, the shaft of the rearview mirror bumps into the edge 138 and is directed to the semi-circle 140 to come to rest in the center opening 128. When sliding from top to bottom, the shaft of the rearview mirror bumps into the edge 138, is directed to the semi-circle 140, and rotates (ratcheting effect) so that the magnetic portion 122 is substantially parallel to ground coming to rest in the center opening 128, such as shown in FIGS. 5A-5C.

Figure 2A:
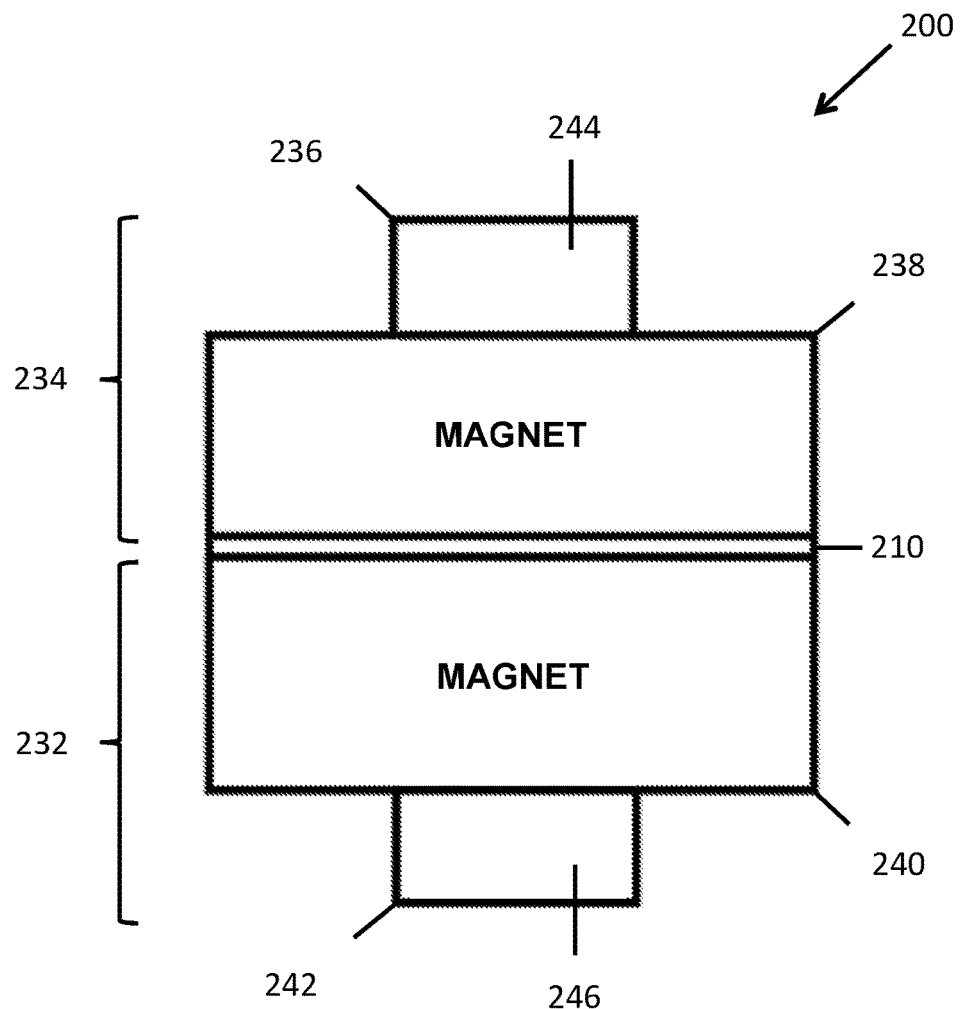
FIGS. 2A-2C are views of a magnetic placard adapter.
Figure 2B:
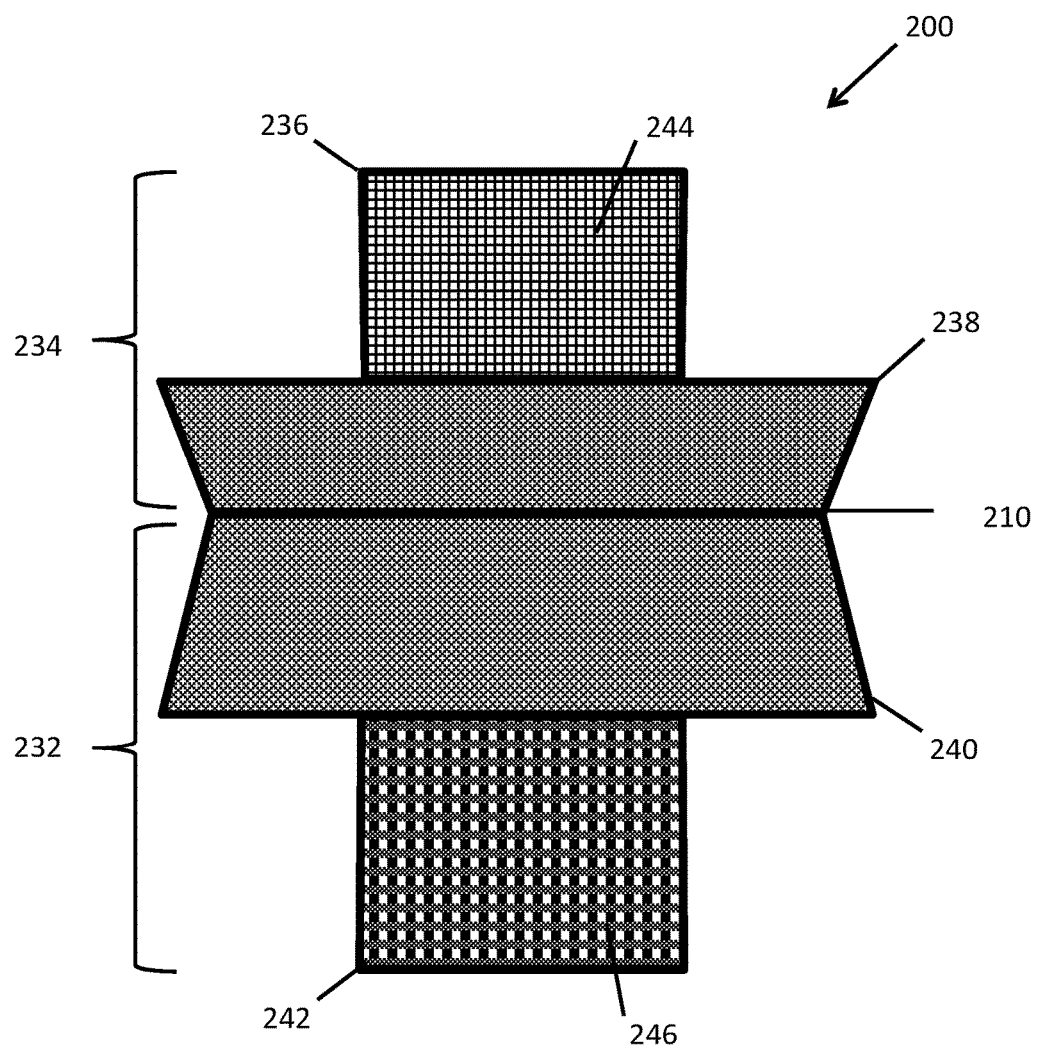
Figure 2C:
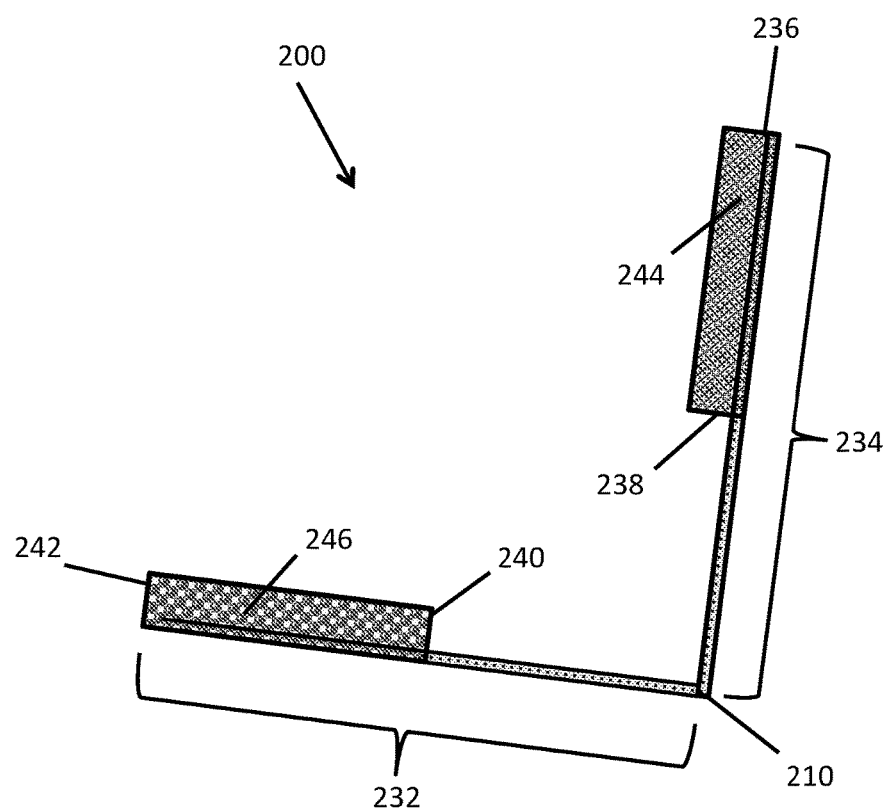
Figure 3:
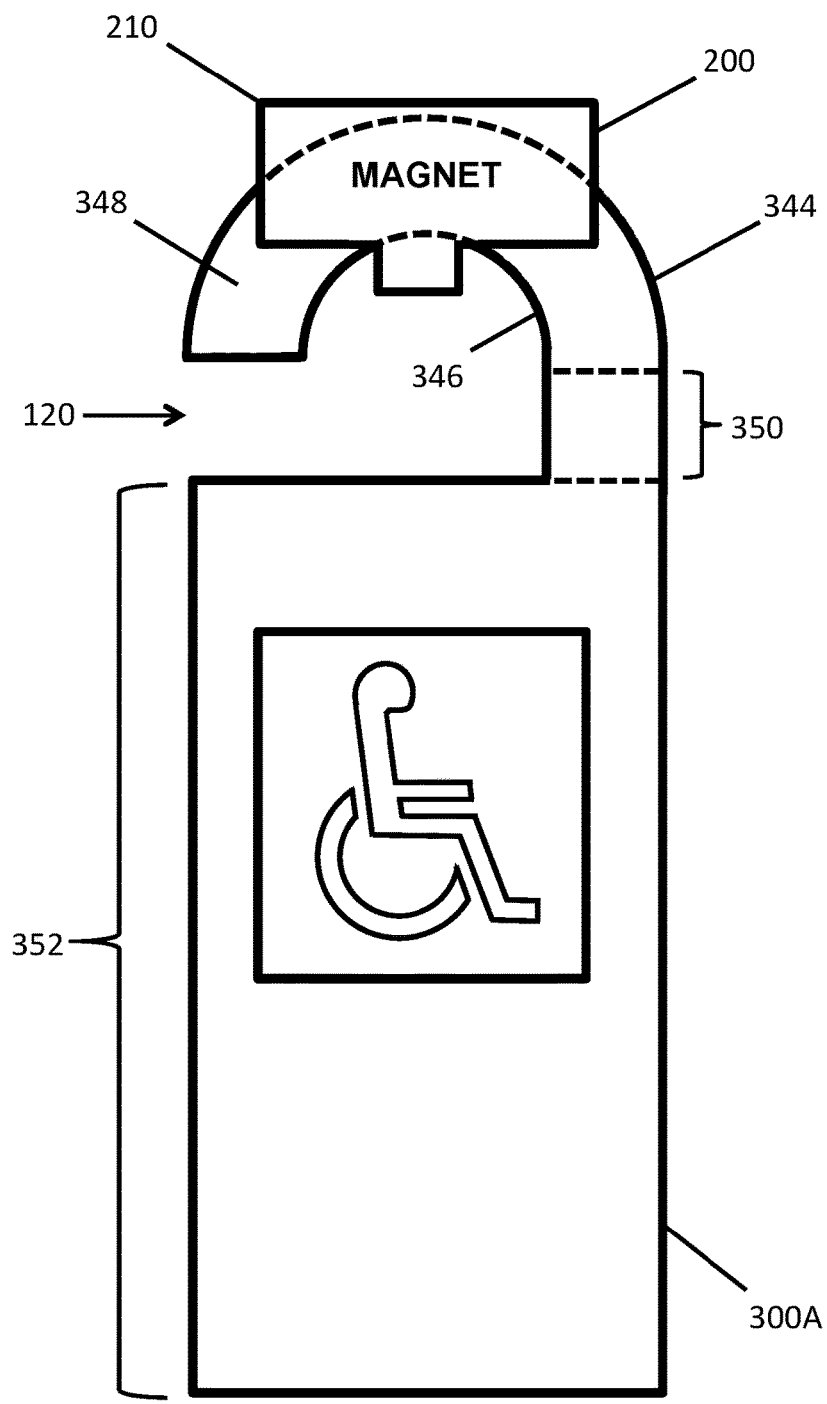
FIG. 3 is a plan view of an embodiment of a magnetic placard including a non-magnetic placard coupled to a magnetic placard adapter.

Referring now to FIGS. 2A-2C, a magnetic placard adapter (placard holder) 200 is shown for adapting a standard non-magnetic placard 300A (e.g., see FIG. 3) to magnetically couple to the magnetic hanger 100 shown in FIG. 1. The magnetic placard adapter 200 couples to the hook portion 348 of the standard placard 300A as shown in FIG. 3. When coupled together, the magnetic placard adapter and the non-magnetic placard may be referred to herein as a magnetic placard.

The magnetic placard adapter 200 has first fastening half 232 and a second fastening half 234 coupled together along a resilient foldable hinge 210. The first fastening half includes a first jaw 240 and a first tab 242. The second fastening half 234 includes a second jaw 238 and a second tab 236. The first fastening half 232 and the second fastening half 234 are folded together along the foldable hinge 210 so that the first tab and the second tab can couple together.

First jaw 240 and second jaw 238 are shaped to removably receive the hook portion 348 of the placard 300A. The first jaw 240 and second jaw 238 are folded together along the foldable hinge 210 to receive placard 300A and hold placard 300A in place by tab 242 and a second tab 236. The first and second jaws 240,238 are each impregnated or encapsulate a magnetic material. The magnetic material of the first and second jaws 240,238 can couple to the magnetic material in the magnetic portion 122 of the magnetic hanger 100.

A small loop or hook fastener fabric 246 is coupled to one tab of the first fastening half. Respectively, a small hook or loop fastener fabric 244 is coupled to the second tab of the second fastening half. The loop fastener fabric couples to the hook fastener fabric. When the tabs 242,236 are pressed together, the fastener fabrics 244,246 adhere to one another coupling the first fastening half 232 and the second fastening half 234 together. The tabs 242,236 can be pulled on to separate the loop fastener fabric and the hook fastener fabric to decouple the first fastening half 232 from the second fastening half 234.

Referring now to FIG. 3, the magnetic placard adapter 200 is coupled to the placard 300A to form one embodiment of a magnetic placard. The placard 300A includes a hook portion 348, a neck portion 350 and a display portion 352. The neck portion 350 joins the hook portion 348 and the display portion 352 together. The magnetic placard adapter 200 is coupled to the hook portion 348 of the placard 300A.

Figure 5D:
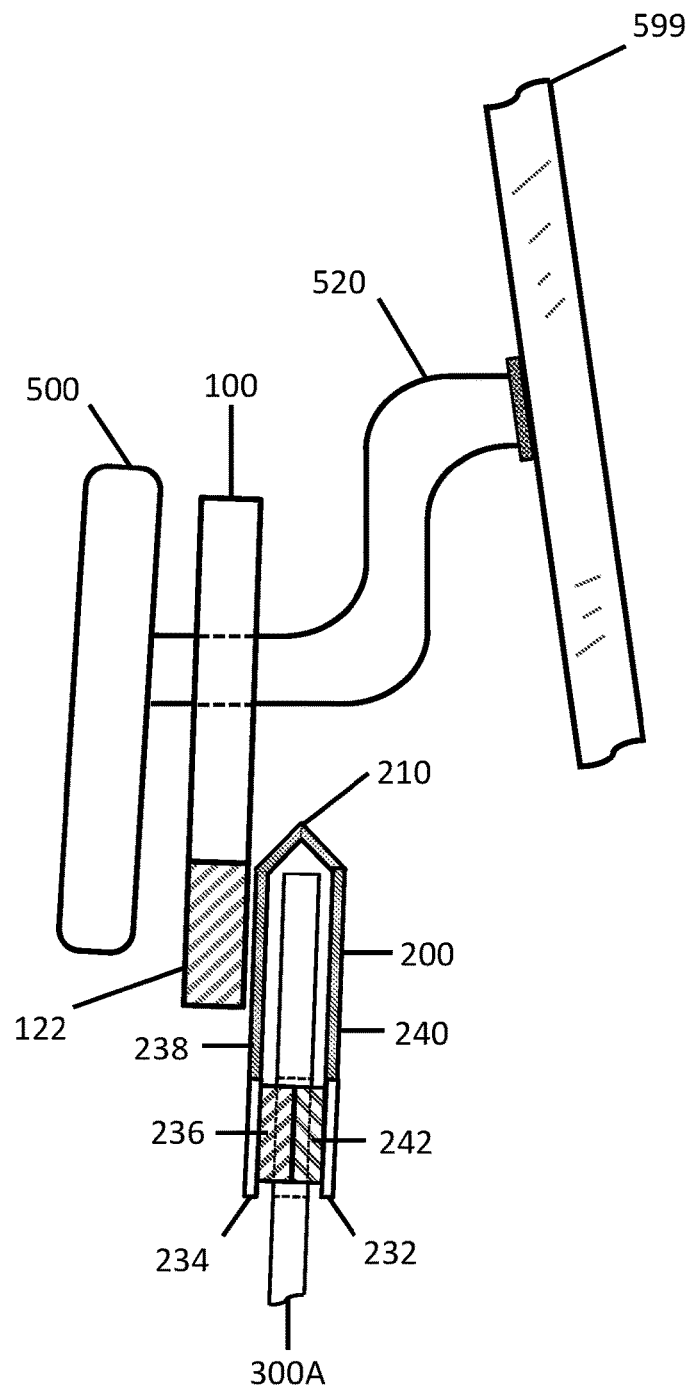
FIG. 5D is a side view with the magnetic hanger of FIG. 1 assembled to the stem of the rearview mirror and magnetically coupled to the magnetic placard of FIG. 3 including the magnetic placard adapter and the non-magnetic placard.

Referring now to FIGS. 3 and 5D, the magnetic placard adapter 200 is coupled to the hook portion 348 of the placard 300A as follows. A center of an outer arc 344 of the hook portion 348 is but up against the foldable hinge 210. The first fastening half 232 and the second fastening half 234 are folded along the foldable hinge 210 over the hook portion 348 of the placard 300A. The size of the magnetic placard adapter 200 is such that the first jaw 240 and the second jaw 238 align somewhat in parallel sandwiching part of the hook portion 348 between the outer arc 344 and an inner arc 346 of the hook portion 348.

Somewhat aligned parallel together, the tabs 236,242 extend beyond the inner arc 346 of the hook portion 348 into an open region between the hook portion 348 and the display portion 352. Recall that the tabs 236,242 each have opposite hook and loop material 244,246 as described herein. To fasten the magnetic placard adapter 200 to the hook portion of the placard, the tabs 242,236 are squeezed together so that the hooks and loops of the opposing hook and loop material 244,246 are coupled together within the open region between the between the hook portion 348 and the display portion 352.

The display portion 352 of the placard 300A illustrates a handicap parking pass which is made from a sheet of plastic. However, it may be appreciated that display portion 352 of the placard 300A could take other forms, such as a sheet of paper, air freshener, a task list, an advertisement, a map, or any other generally flat object which is to be temporarily displayed in a vehicle.

Figure 4:
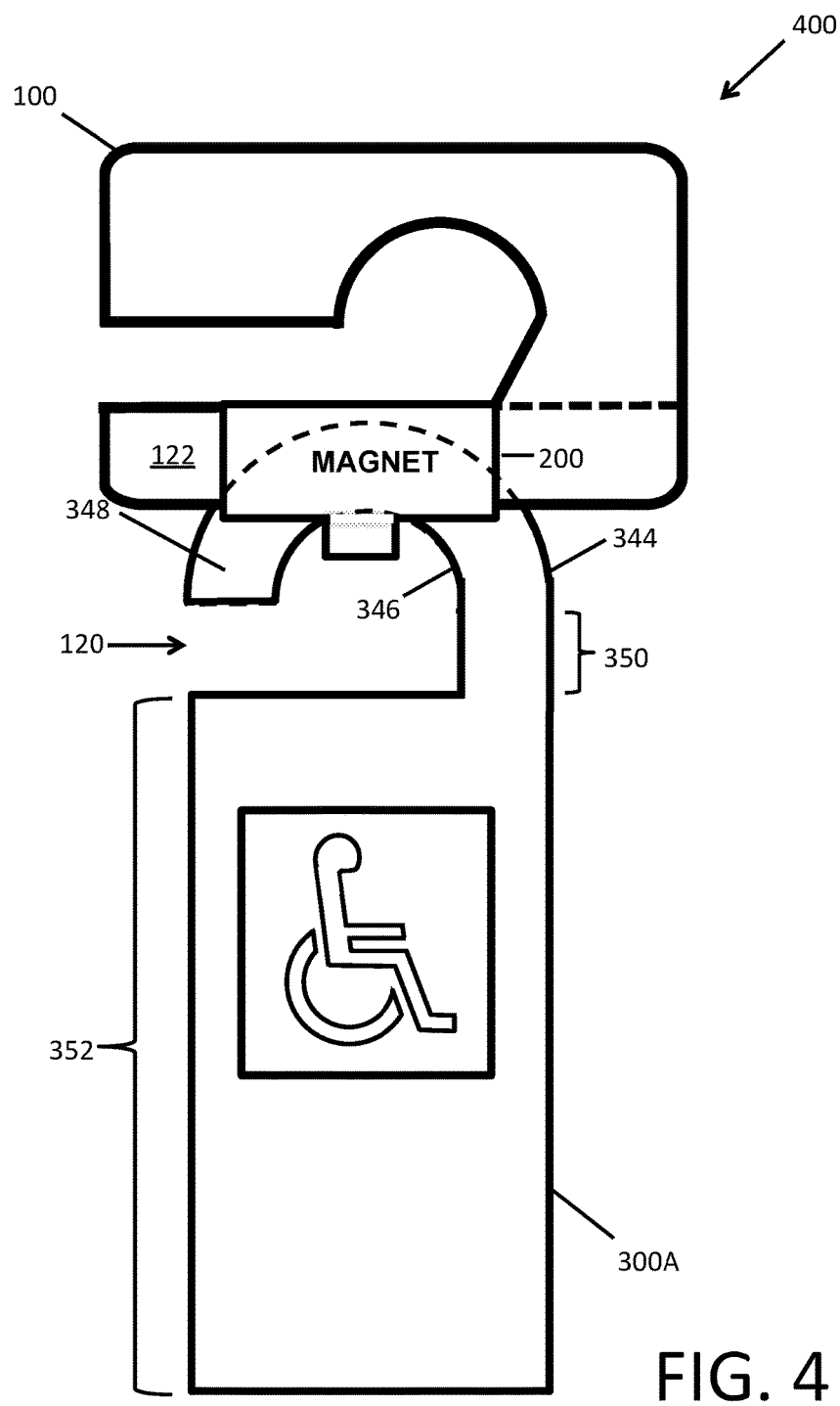
FIG. 4 is a plan view of a magnetic placard hanging system including a magnetic hanger coupled to an embodiment of a magnetic placard including a magnetic placard adapter.

Referring now to FIG. 4, a magnetic placard hanging system 400 is shown. The magnetic placard hanging system 400 includes a placard 300A, a magnetic placard adapter 200, and a magnetic hanger 100. The magnetic placard adapter 200 is coupled to the placard 300A forming an embodiment of a magnetic placard. The magnetic placard adapter 200 is magnetically coupled to the magnetic hanger 100.

The magnetic material of the first and second jaws 240, 238 is magnetically coupled to the magnetic material in the magnetic portion 122 of the magnetic hanger 100. This holds the magnetic placard adapter 200 and placard 300A removably coupled to the magnetic hanger 100. A user need only apply a nominal force to overcome the magnetic force and disconnect the magnetic placard adapter 200 from the magnetic hanger 100. A user can use one hand to grasp a portion of the placard 300A and pull down to separate the magnetic portion of the magnetic placard adapter 200 from the magnetic portion of the magnetic hanger 100.

The magnetic placard adapter 200 is removably connectable to the placard 300A using the loop and hook tabs 242,236. The loop and hook tabs 242,236 can be pulled apart to disconnect the magnetic placard adapter 200 from the placard 300A such as when the expiration date of the placard has passed and a new placard needs to be attached.

A magnetic attraction exists between magnets of opposite polarity. Magnetic attraction further exists between a magnet and a ferrous metal such as iron. Magnets may take on a solid or a flexible form. Magnets may be in a powder or granular form such as aluminum-nickel-cobalt (ALNICO) powder or neodymium powder to mix with other materials. Iron may be in a powder or granular form as well, such as iron filings, to mix with other materials. The powder or granular form of magnets may be mixed into a flexible plastic or polymer. The powder or granular form of iron may be mixed into a flexible plastic or polymer. A magnetic attraction also exists between a solid or flexible magnet and a magnetic powder.

Portions of magnetic hanger 100, placard 300A and the magnetic placard adapter 200 are formed of a flexible plastic or a flexible polymer. In one embodiment, the magnetic portion 122 of the magnetic hanger 100 and the magnetic jaws 242, 236 of the magnetic placard adapter 200 are formed by a magnetic powder mixed into the flexible plastic or polymer. In another embodiment, the magnetic portion 122 of the magnetic hanger 100 and the magnetic jaws 242, 236 of the magnetic placard adapter 200 are formed by encapsulating polar opposite magnets in the flexible plastic or polymer. In another embodiment, the magnetic portion 122 of the magnetic hanger 100 is formed by a magnetic powder mixed into the flexible plastic or polymer and the magnetic jaws 242, 236 of the magnetic placard adapter 200 are formed by iron filings mixed into the flexible plastic or polymer. In another embodiment, the magnetic portion 122 of the magnetic hanger 100 is formed by iron filings mixed into the flexible plastic or polymer and the magnetic jaws 242, 236 of the magnetic placard adapter 200 are formed by a magnetic powder mixed into the flexible plastic or polymer. In another embodiment, the magnetic portion 122 of the magnetic hanger 100 is formed by encapsulating a magnet into the flexible plastic or polymer and the magnetic jaws 242, 236 of the magnetic placard adapter 200 are formed by iron filings or magnetic powder mixed into the flexible plastic or polymer. In another embodiment, the magnetic portion 122 of the magnetic hanger 100 is formed by iron filings or magnetic powder mixed into the flexible plastic or polymer and the magnetic jaws 242, 236 of the magnetic placard adapter 200 are formed by encapsulating a magnet into the flexible plastic or polymer.

FIG. 5A is a front view of the magnetic hanger 100 coupled to the mirror 500 by sliding the magnetic hanger 100 from left to right over the stem 520 of the mirror 500. When sliding from left to right, the shaft of the rearview mirror bumps into the edge 138 and is directed to the semi-circle 140 to come to rest in the center opening 128.

FIG. 5B is a front view with the magnetic hanger 100 coupled to the mirror 500 by sliding the magnetic hanger 100 from right to left over the stem 520 of the mirror 500. When sliding from right to left, the shaft of the rearview mirror bumps into the edge 138 and is directed to the semi-circle 140 to come to rest in the center opening 128.

FIG. 5C is a front view with the magnetic hanger 100 coupled to the mirror 500 by sliding the magnetic hanger from top to bottom onto the stem 520 of the mirror 500. When sliding from top to bottom, the shaft of the rearview mirror bumps into the edge 138, is directed to the semi-circle 140, and rotates (ratcheting effect) so that the magnetic portion 122 is substantially parallel to ground coming to rest in the center opening 128.

Referring now to FIG. 5D, a side view of the magnetic hanger system 400 coupled to the stem 520 of the rearview mirror 500. The magnetic hanger 100 of the magnetic hanger system 400 is coupled to the stem 520 of the rearview mirror 500. The magnetic placard adapter 200 as assembled to the placard 300A of the magnetic hanger system 400 is magnetically coupled to the magnetic portion 122 of the magnetic hanger 100.

Magnetic Placard

FIG. 3 illustrates a placard 300A coupled to a magnetic placard adapter 200 to form an embodiment of a magnetic placard. The magnetic jaws of the magnetic placard adapter 200 can be integrated into the placard in an alternate embodiment.

Figure 6:
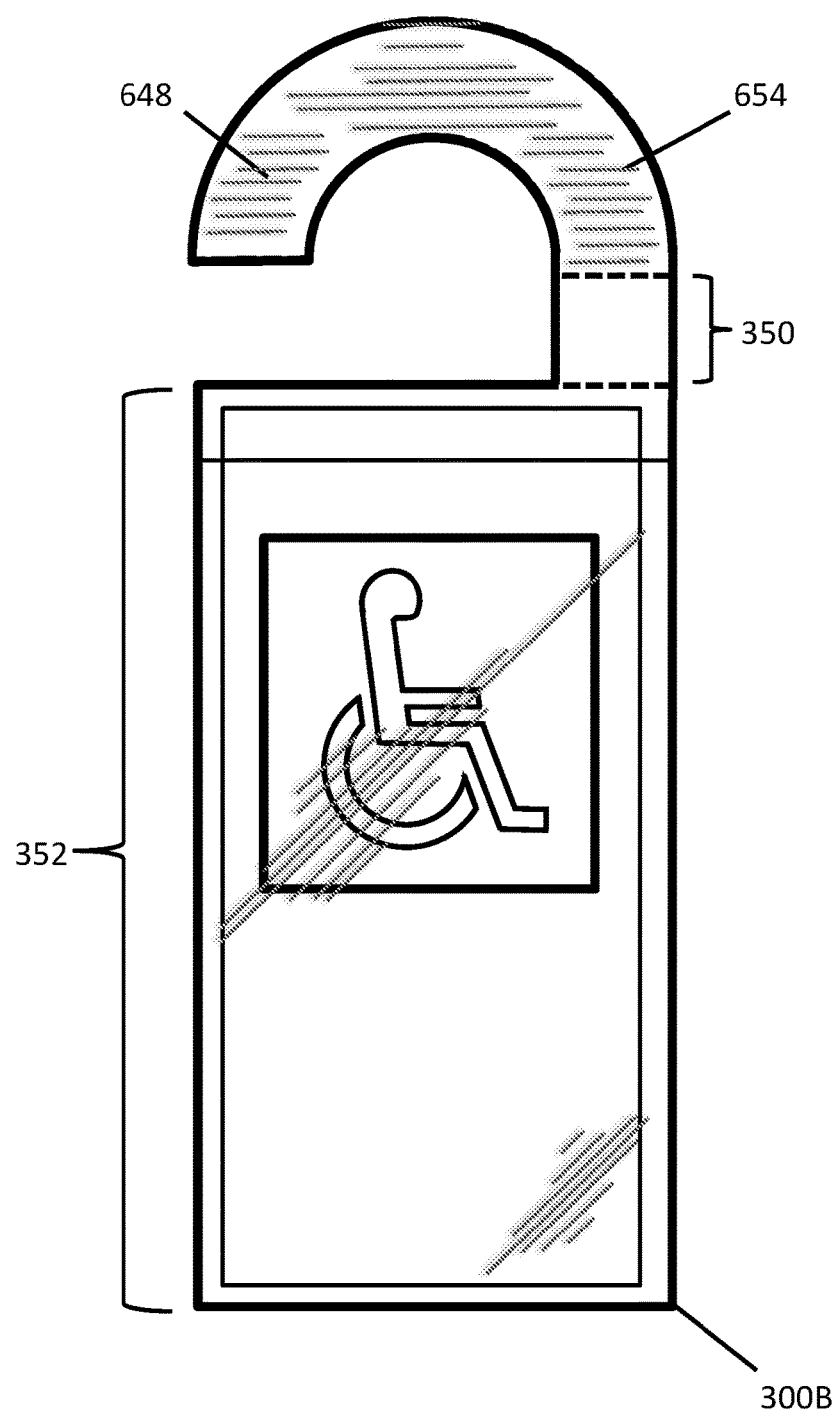
FIG. 6 is a plan view of a magnetic placard having a magnet member encapsulated or imbedded into a portion of the body of the magnetic placard.

Referring now to FIG. 6, a front view of a magnetic placard 300B is shown. The magnetic placard 300B includes a hook portion 648, a neck portion 350 and a display portion 352. The neck portion 350 joins the hook portion 648 and the display portion 352 together.

A magnetic material (magnetic member) 654 is imbedded in the hook portion 648 of the magnetic placard 300B. The magnetic material 654 may be a magnetic powder mixed into the flexible plastic or polymer. In another embodiment, the magnetic material 654 may be iron filings mixed into the flexible plastic or polymer. In another embodiment, the magnetic material 654 may be formed by encapsulating a solid or flexible magnet into the flexible plastic or polymer.

The magnetic material 654 is mixed into the plastic polymer to form the hook portion 648 of the magnetic placard 300B. The neck portion 350 and the display portion 352 lack the magnetic material 654.

Figure 7:
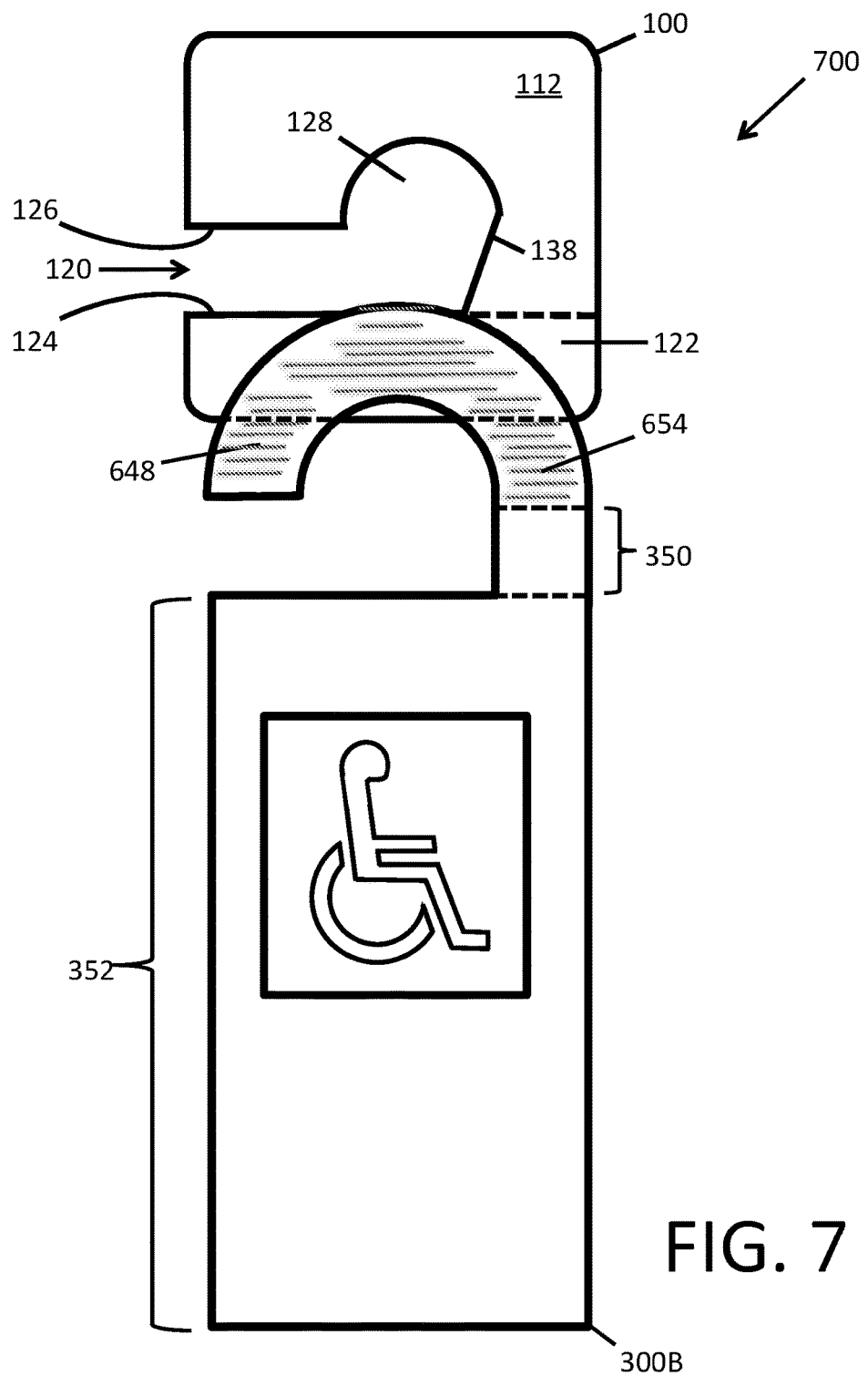
FIG. 7 is a plan view of a magnetic placard hanging system with the magnetic placard of FIG. 6 magnetically coupled to the magnetic hanger of FIG. 1.

Referring now to FIG. 7, a magnetic placard hanging system 700 is shown for magnetically connecting the magnetic placard 300B to a stem of a rearview mirror in a motor vehicle. The magnetic placard hanging system 700 includes the magnetic placard 300B and the magnetic hanger 100.

The hook portion 648 of the magnetic placard 300B with the magnetic material 654 is magnetically (and removably) coupled to the magnetic portion 122 of the magnetic hanger 100. The magnetic placard 300B can be readily disconnected from the magnetic hanger 100 with a minor force that individuals can easily exert, including most of those with some sort of disability or handicap.

Alternate Magnetic Placards

In an alternate embodiment, the placards 300A,300B may instead be a document holder with a clear plastic receiver to receive a document and magnetically couple to the magnetic hanger 100.

Figure 8:
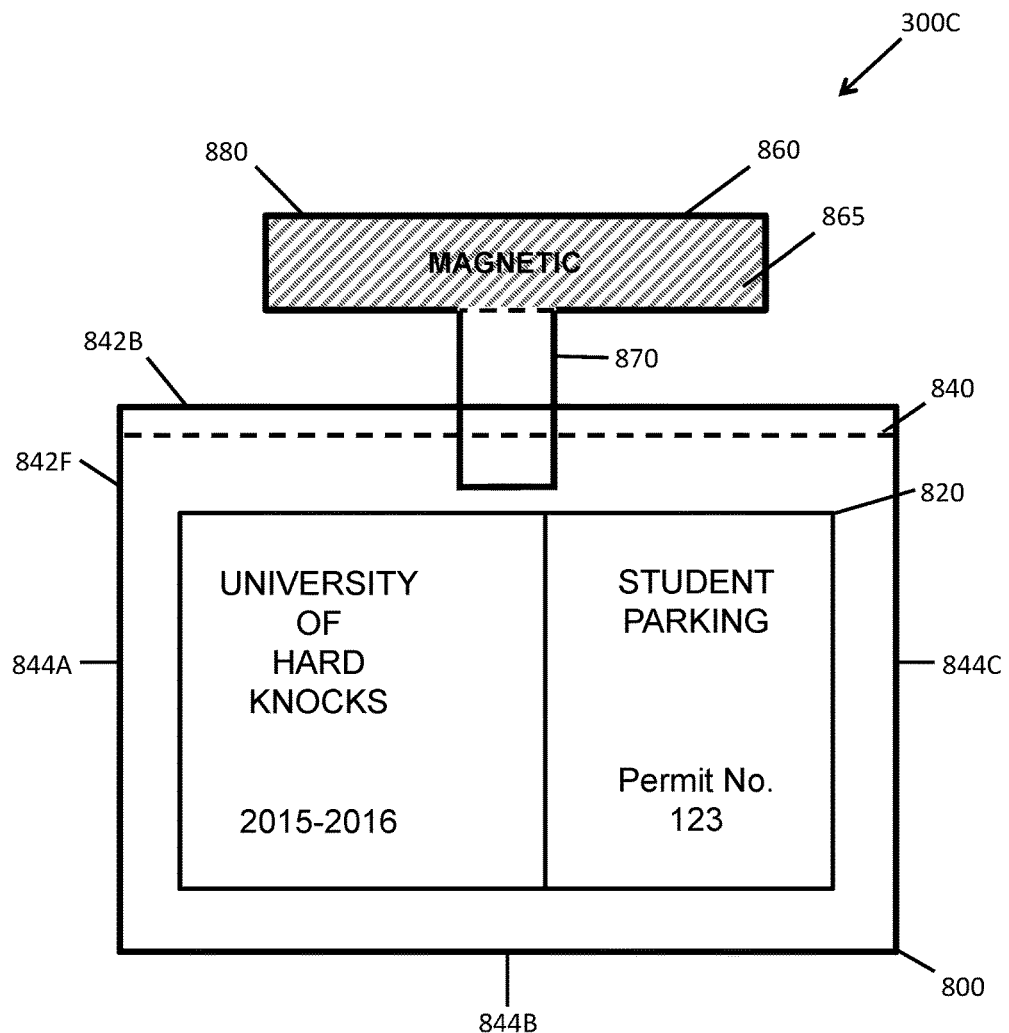
FIG. 8 is a plan view of an alternate embodiment of a magnetic placard.

Referring now to FIG. 8, a front view of a magnetic document holding placard 300C is shown. The magnetic document holding placard 300C includes a clear plastic envelope 800 coupled to a magnetic connector 880. The magnetic connector 880 includes a magnetic portion 860 and neck portion 870. The clear plastic envelope 800 is coupled to the magnetic connector 800 near an end of the neck portion 870. The magnetic portion 860 includes a magnetic material 865.

The clear plastic envelope 800 includes a sleeve opening 840 and two sides 842F,842B sealed together along three edges 844A, 844B, 844C. The backside 842B of the clear plastic envelope 800 couples to the neck portion 870. The sleeve opening 840 allows one to insert a flat document 820 between the front side 842F and the backside 842B of the clear plastic envelope 800.

The magnetic material 865 is imbedded in the magnetic portion 860 of the magnetic connector 880 of the magnetic document holding placard 300C. The magnetic material 865 may be a magnetic powder mixed into the flexible plastic or polymer. The magnetic powder may be an aluminum-nickel-cobalt (ALNICO) powder or a neodymium powder. In another embodiment, the magnetic material 865 may be iron filings mixed into the flexible plastic or polymer. In another embodiment, the magnetic material 865 may be formed by encapsulating a magnet into the flexible plastic or polymer. The encapsulated magnet would have the opposite polarity of an encapsulated magnet in the magnetic portion of the magnetic hanger 100.

In another alternate embodiment, the placards 300A,300B may instead be a document holder with a fastening system to receive a document and magnetically couple it to the magnetic hanger 100.

Figure 9:
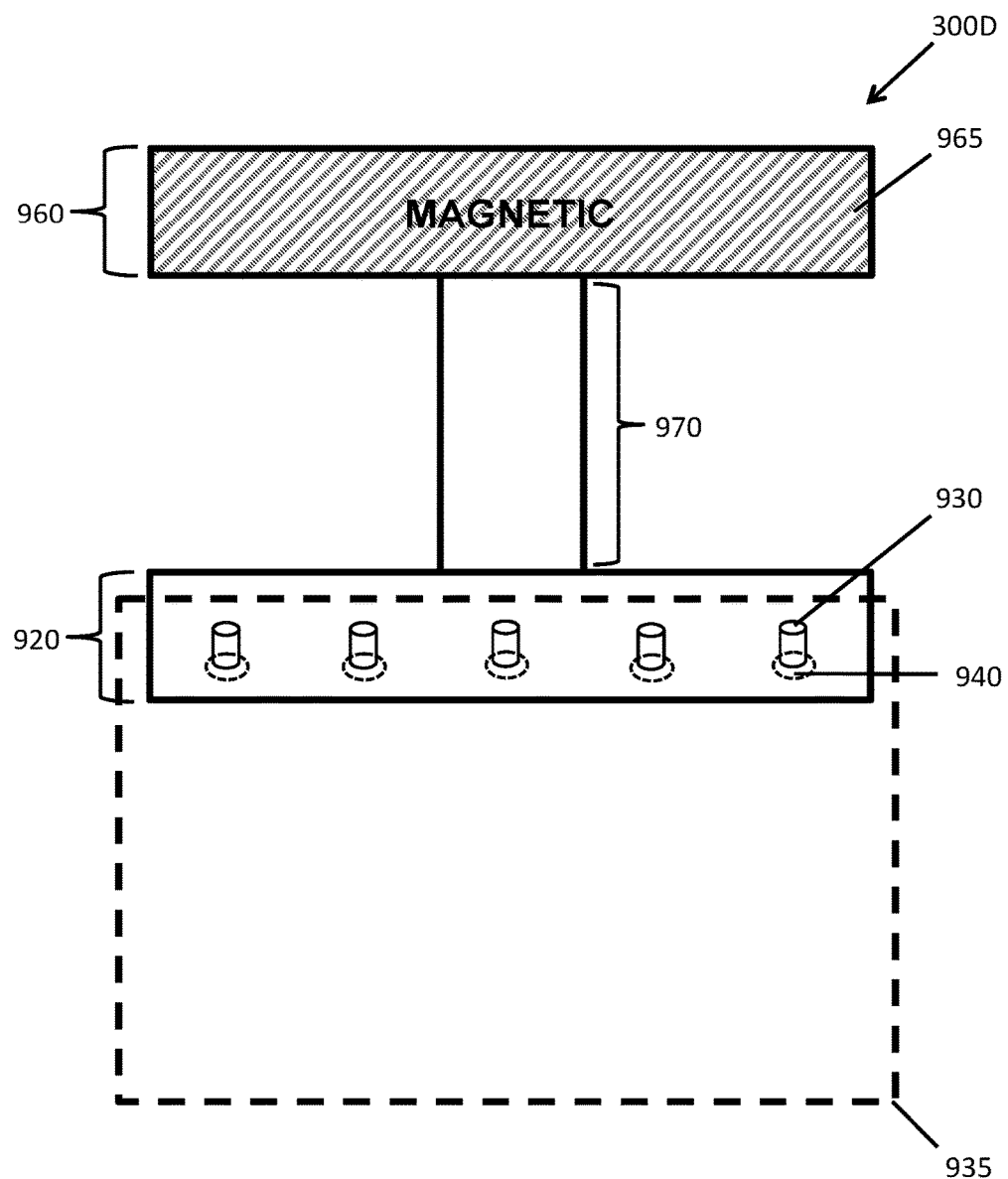
FIG. 9 is a plan view of another alternate embodiment of a magnetic placard.

Referring now to FIG. 9, another embodiment of a placard is shown that can couple to the magnetic hanger 100. A front view of a magnetic placard 300D is shown. The magnetic placard 300D includes a fastener portion 920, a neck portion 970, and a magnetic portion 960. The magnetic placard 300D is coupled to a document 935 for display from a rear view mirror of a motor vehicle.

A magnetic material 965 is imbedded in the magnetic portion 960 of the magnetic placard 300D. The magnetic material 965 may be a magnetic powder mixed into the flexible plastic or polymer. The magnetic powder may be an aluminum-nickel-cobalt (ALNICO) powder or a neodymium powder. In another embodiment, the magnetic material 965 may be iron filings mixed into the flexible plastic or polymer. In another embodiment, the magnetic material 965 may be formed by encapsulating a magnet into the flexible plastic or polymer. The encapsulated magnet would have the opposite polarity of an encapsulated magnet in the magnetic portion of the magnetic hanger 100.

The fastener portion of the magnetic placard 300D includes one or more fasteners 930. The one or more fasteners 930 may be hooks, pegs, or rivets. The one or more fasteners are used to couple a document 935 to the magnetic placard 300D. The one or more fasteners 930 may project out and up in an upward fashion.

The document 935 includes one or more holes 940 that are respectively received by the one or more fasteners 930 of the fastener portion 920 of the magnetic placard 300D. The one or more fasteners 930 hold a side of the document 935 coupled to the magnetic placard 300D.

The document 935 may a temporary parking permit, a name for a reserved parking space, or a more permanent annual parking pass, for example. The document 935 may include a support string. The fastener may be an upwardly projecting peg around which the support string may be wrapped.

Method of Using

Methods of using the magnetic placard holding systems to display information from a rear view mirror in a motor vehicle are now described. In a first method, a method for displaying a placard from a stem of a rearview mirror in a motor vehicle is disclosed. The method includes mounting a magnetic hanger to a stem of a rearview mirror; placing a magnetic portion of a magnetic placard near the magnetic portion of the magnetic hanger; and allowing magnetic attraction to removably couple the magnetic portions of the magnetic hanger and the magnetic placard together to display a display portion of the magnetic placard from the rearview mirror. The magnetic hanger includes a magnetic portion and a supporting portion configured to hook onto the stem of the rearview mirror.

The magnetic placard comprises a magnetic placard adapter coupled to a hook portion of a non-magnetic placard. The magnetic placard adapter has a first fastening half and a second fastening half coupled together by a folding hinge. The first fastening half has a first magnetic jaw and a first tab with a hook fastening material. The second fastening half has a second magnetic jaw and a second tab with a loop fastening material. The magnetic placard adapter is coupled to the non-magnetic placard by spreading apart the first fastening half and the second fastening half of the magnetic placard adapter; butting an outer arc of a hook portion of the non-magnetic placard against the folding hinge; folding the first fastening half and the second fastening half along the folding hinge around the hook portion of the non-magnetic placard; and squeezing together the first tab with the hook fastening material and the second tab with the loop fastening material to couple the hook fastening material and the loop fastening material together in an opening between the hook portion and the display portion of the non-magnetic placard.

The magnetic hanger may be coupled to the rearview mirror in various ways. In accordance with one embodiment, the mounting of the magnetic hanger to the stem of the rearview mirror includes horizontally aligning a slotted opening with the stem of the rearview mirror; horizontally sliding the slotted opening over the stem up to a slanted edge of the magnetic hanger; and allowing the magnetic hanger to drop down and couple a semi-circle edge of the supporting portion of the magnetic hanger to the top portion of the stem. In accordance with another embodiment, the method of mounting the magnetic hanger to the stem of the rearview mirror includes vertically aligning a slotted opening with the stem of the rearview mirror; vertically sliding the slotted opening over the stem up to a slanted edge of the magnetic hanger; following the slanted edge into a semicircle edge of the magnetic hanger; and allowing the magnetic hanger to ratchet around the stem such that the magnetic portion of the magnetic hanger is below the stem and the supporting portion of the hanger is above the stem.

CONCLUSION

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination.

Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by patented claims that follow below.

What is claimed is:

1. A device for connecting a placard to a rearview mirror of a motor vehicle, the rearview mirror having a stem, the device comprising:
   a hanger having an upper portion which connects to the stem of the rearview mirror, the hanger having a lower portion;
   a placard adapter having a first jaw and an opposing second jaw connected to the first jaw by a hinge, the first and second jaws shaped and dimensioned to removably receive a portion of a placard, the placard adapter removably and magnetically connectable to the hanger;
   a first magnetic member disposed in the lower portion of the hanger; and
   a second magnetic member disposed in the first and second jaws of the placard adapter;
   wherein the first and second magnetic members cooperate to effect a magnetic connection of the placard adapter to the hanger.

2. The device of claim 1, wherein
   the placard adapter further includes
   a first tab coupled to the first jaw and a second tab coupled to the second jaw;
   a loop fastening material coupled to the first tab and a hook fastening material coupled to the second tab;
   wherein the loop fastening material and the hook fastening material couple together to hold the placard adapter coupled to the placard.

3. The device of claim 1, wherein
   the first magnetic member is magnetic powder; and
   the second magnetic member is magnetic powder.

4. The device of claim 1, wherein
   the first magnetic member is a first magnet having a first pole; and
   the second magnetic member is a second magnet having a second pole opposite the first pole.

5. The device of claim 1, wherein
   the first magnetic member is magnetic powder; and
   the second magnetic member is iron filings.

6. The device of claim 1, wherein
   the first magnetic member is iron filings; and
   the second magnetic member is magnetic powder.

7. The device of claim 1, wherein
   the first magnetic member is magnetic powder; and
   the second magnetic member is a magnet.

8. The device of claim 1, wherein
   the first magnetic member is magnet; and
   the second magnetic member is magnetic powder.

9. The device of claim 1, wherein
   the first magnetic member is a magnet; and
   the second magnetic member is iron filings.

10. The device of claim 1, wherein
    the first magnetic member is iron filings; and
    the second magnetic member is a magnet.

11. An apparatus for connecting a placard to the rearview mirror of a motor vehicle, the rearview mirror having a stem, the apparatus comprising:
    a hanger having an side slot opening to couple the hanger to the stem of the rearview mirror, the hanger having a first magnetic member in a hanging portion; and
    a magnetic placard adapter having a first half and an a second half folded over a hook portion of a standard placard at a folding hinge and coupled together around the hook portion by hook and loop fasteners, the magnetic placard adapter having at least a second magnetic member in the first half or the second half to removably and magnetically couple to the hanger;
    wherein the first and second magnetic members cooperate to effect a magnetic connection of the magnetic placard adapter to the magnetic hanger to removeably hang the standard placard from the stem of the rearview mirror.

12. An apparatus for connecting a placard to the rearview mirror of a motor vehicle, the rearview mirror having a stem, the apparatus comprising:
    a magnetic hanger with a side slotted opening connectable to the stem of a rearview mirror of a motor vehicle, the magnetic hanger having a supporting portion and a magnetic portion, wherein a first magnetic member disposed in the magnetic portion of the magnetic hanger;
    a magnetic placard having an integral magnetic hook portion with magnetic powder, a neck portion coupled to the magnetic hook portion, and a display portion coupled to the neck portion;
    wherein the magnetic portion of the magnetic hanger and the integral magnetic hook portion of the magnetic placard are configured to effect a magnetic connection of the magnetic placard to the magnetic hanger to removeably hang the magnetic placard from the stem of the rearview mirror.

13. The apparatus of claim 12, wherein
    the first magnetic member is magnetic powder.

14. The apparatus of claim 12, wherein
    the first magnetic member is a first magnet.

15. The apparatus of claim 12, wherein
    the first magnetic member is iron filings.

16. The apparatus of claim 11, wherein
    the first magnetic member is iron filings, magnetic powder, or a magnet; and
    the second magnetic member is a magnet, magnetic powder or iron filings.

17. An apparatus for connecting a placard to the rearview mirror of a motor vehicle, the rearview mirror having a stem, the apparatus comprising:
    a magnetic hanger with a side slotted opening connectable to the stem of a rearview mirror of a motor vehicle, the magnetic hanger having a supporting portion and a magnetic portion wherein a first magnetic member disposed in the magnetic portion of the magnetic hanger;
    a magnetic placard having an integral magnetic hook portion with an integral magnet, a neck portion coupled to the magnetic hook portion, and a display portion coupled to the neck portion;
    wherein the magnetic portion of the magnetic hanger and the integral magnetic hook portion of the magnetic placard are configured to effect a magnetic connection of the magnetic placard to the magnetic hanger to removeably hang the magnetic placard from the stem of the rearview mirror.

18. The apparatus of claim 17, wherein
    the first magnetic member is magnetic powder.

19. The apparatus of claim 17, wherein
    the first magnetic member is a first magnet.

20. The apparatus of claim 17, wherein the first magnetic member is iron filings.

\* \* \* \* \*